United States Patent
ElNakib et al.

(10) Patent No.: US 10,057,264 B1
(45) Date of Patent: Aug. 21, 2018

(54) ANALYTICS-BASED INTERNET OF THINGS SECURITY PLATFORM

(71) Applicant: EMC Corporation, Hopkinton, MA (US)

(72) Inventors: Eslam ElNakib, New Cairo (EG); Mohammed Hashem, New Cairo (EG); Osama Salah, New Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 239 days.

(21) Appl. No.: 15/165,437

(22) Filed: May 26, 2016

Related U.S. Application Data

(60) Provisional application No. 62/268,098, filed on Dec. 16, 2015.

(51) Int. Cl.
*H04L 29/06* (2006.01)
*H04L 29/08* (2006.01)

(52) U.S. Cl.
CPC ........ *H04L 63/0876* (2013.01); *H04L 63/102* (2013.01); *H04L 67/10* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 8,261,322 B2* | 9/2012 | Larsen | H04L 12/281 709/220 |
| 9,020,802 B1 | 4/2015 | Florissi et al. | |
| 9,031,992 B1 | 5/2015 | Florissi et al. | |
| 9,106,436 B2* | 8/2015 | Larsen | H04L 12/281 |
| 9,158,843 B1 | 10/2015 | Florissi et al. | |
| 9,882,912 B2* | 1/2018 | Joo | H04L 63/102 |
| 9,917,903 B2* | 3/2018 | Clernon | H04W 4/70 |

(Continued)

OTHER PUBLICATIONS

Searchsecurity, "Big Data Analytics: New Patterns Emerge for Security," http://searchsecurity.techtarget.com/feature/Big-data-analytics-New-patterns-emerge-for-security, Jun. 2013, 7 pages, vol. 15, No. 5.

(Continued)

*Primary Examiner* — Christopher Revak
(74) *Attorney, Agent, or Firm* — Ryan, Mason & Lewis, LLP

(57) ABSTRACT

An apparatus comprises a processing platform configured to communicate with a plurality of IoT devices over at least one network. The processing platform implements a security-as-a-service portal accessible to the IoT devices, the portal comprising an analytics engine configured to assign trust scores to respective ones of the IoT devices. The security-as-a-service portal provides authentication leveling functionality for the IoT devices based at least in part on the assigned trust scores. In accordance with the authentication leveling functionality, a first one of the IoT devices accesses the security-as-a-service portal to identify a level of authentication to be applied by the first IoT device in authenticating a second one of the IoT devices. The security-as-a-service portal may determine the authentication level to be applied by the first IoT device in authenticating the second IoT device based at least in part on the trust score assigned to the second IoT device.

20 Claims, 9 Drawing Sheets

(56) References Cited

U.S. PATENT DOCUMENTS

| | | | |
|---|---|---|---|
| 2014/0244836 A1 | 8/2014 | Goel et al. | |
| 2015/0007273 A1* | 1/2015 | Lin | H04L 63/08 |
| | | | 726/4 |
| 2015/0195296 A1 | 7/2015 | Vasseur et al. | |
| 2015/0229654 A1 | 8/2015 | Perier | |
| 2015/0310195 A1 | 10/2015 | Bailor | |
| 2016/0050279 A1 | 2/2016 | Pahng | |
| 2016/0112374 A1 | 4/2016 | Branca | |
| 2017/0006528 A1* | 1/2017 | Bari | H04W 48/16 |
| 2017/0026157 A1* | 1/2017 | Bugenhagen | H04L 5/0053 |
| 2017/0026472 A1* | 1/2017 | Bugenhagen | H04L 67/12 |
| 2017/0155703 A1* | 6/2017 | Hao | H04W 4/70 |

OTHER PUBLICATIONS

GSM Association, "Understanding the Internet of Things (IoT)," Connected Living, Jul. 2014, 15 pages.

Gartner's, "Gartner's 2014 Hype Cycle for Emerging Technologies Maps the Journey to Digital Business," http://www.gartner.com/newsroom/id/2819918, Aug. 11, 2014, 5 pages.

Lynn Price, "Big Data and Actionable Analytics: Is it All Hype?" https://securityintelligence.com/big-data-and-actionable-analytics-is-it-all-hype!, Jun. 12, 2013, 4 pages.

IDC, "Market in a Minute: Internet of Things," http://www.idc.com/downloads/idc_market_in_a_minute_iot_infographic.pdf, 2014-2020, 1 page.

IEEE Standards Association, "P2413—Standard for an Architectural Framework for the Internet of Things (IoT)," https://standards.ieee.org/develop/project/2413.html, May 4, 2016, 1 page.

cisco.com, "Internet of Things (IoT)," http://www.cisco.com/c/en/us/solutions/internet-of-things/iot-products.html, May 4, 2016, 2 pages.

ISO/IEC JTC 1, "Internet of Things (IoT)," Preliminary Report, 2014, 17 pages.

abiresearch.com, "More Than 30 Billion Devices Will Wirelessly Connect to the Internet of Everything in 2020," https://www.abiresearch.com/press/more-than-30-billion-devices-will-wirelessly-conne/, May 9, 2013, 1 page.

mfrontiers.com, "mFinity IoT," http://www.mfrontiers.com/mfinity-iot-overview/, May 18, 2016, 2 pages.

gartner.com, "It Glossary," http://www.gartner.com/it-glossary/, May 4, 2016, 3 pages.

V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.

International Telecommunication Union, "Series Y: Global Information Infrastructure, Internet Protocol Aspects and Next-Generation Networks: Next Generation Networks—Frameworks and Functional Architecture Models," Recommendation ITU-T Y.2060, Jun. 2012, 22 pages.

\* cited by examiner

| User | Device | MAC | IoT Rel ID | Trust Score |
|---|---|---|---|---|
| User 1 | Mobile | x...1 | M1 | 8 |
| | Cooker | z...2 | C1 | 7 |
| | E-Curtains | y...3 | C2 | 8 |
| | Door | a...4 | D1 | 9 |
| User 2 | Mobile | b...5 | M2 | 9 |
| | Laptop | f...6 | L1 | 8 |
| | Cooker | i...7 | C3 | 8 |
| | Car | e...8 | C4 | 8 |

ANALYTICS-BASED INTERNET OF THINGS SECURITY PLATFORM

FIELD

The field relates generally to information processing systems, and more particularly to security in information processing systems.

BACKGROUND

Information processing systems based on the Internet of Things (IoT) can be configured to process potentially enormous amounts of data from distributed sensors, smart objects, smart appliances, smart automobiles or other types and arrangements of interconnected IoT devices, collectively numbering in the billions. However, significant problems have arisen relating to security of IoT devices. For example, many IoT devices are not designed to implement adequate security functionality. Moreover, existing system-based security approaches are often not readily scalable to accommodate the ever-increasing numbers of IoT devices being deployed. Such approaches can unduly increase the complexity of the overall system, leading to adverse impacts on system performance.

SUMMARY

Illustrative embodiments of the present invention provide analytics-based IoT security platforms. For example, some embodiments provide an analytics-based IoT security platform configured to implement a security-as-a-service portal accessible to IoT devices over a network. The security-as-a-service portal illustratively provides dynamic trust scoring and associated authentication leveling functionality for IoT devices. Such arrangements can be used to allow IoT devices to authenticate one another in a particularly efficient and scalable manner. In addition, Big Data analytics can be leveraged by the security-as-a-service portal to implement trend analysis models, behavioral profiling and anomaly detection in generating and assigning trust scores to individual IoT devices or clusters of such devices.

In one embodiment, an apparatus comprises a processing platform configured to communicate with a plurality of IoT devices over at least one network. The processing platform implements a security-as-a-service portal accessible to the IoT devices. The security-as-a-service portal comprises an analytics engine configured to assign trust scores to respective ones of the IoT devices. The security-as-a-service portal provides authentication leveling functionality for the IoT devices based at least in part on the assigned trust scores. In accordance with the authentication leveling functionality, a first one of the IoT devices accesses the security-as-a-service portal to identify a level of authentication to be applied by the first IoT device in authenticating a second one of the IoT devices.

For example, the security-as-a-service portal may determine the authentication level to be applied by the first IoT device in authenticating the second IoT device based at least in part on the trust score assigned to the second IoT device, and communicate the determined authentication level to the first IoT device.

As another example, the security-as-a-service portal can communicate at least the trust score of the second IoT device to the first IoT device so as to permit the first IoT device to determine the authentication level to be applied by the first IoT device in authenticating the second IoT device.

One or more of the illustrative embodiments provide significant advantages relative to conventional arrangements. For example, in some embodiments, a security-as-a-service portal easily scales to accommodate increasingly large numbers of IoT devices without requiring any significant redesign of the devices themselves and without undermining overall system security and performance. Big Data analytics implemented within an analytics-based IoT security platform utilize data collected from the IoT devices to ensure that trust scores are generated and assigned in an accurate and efficient manner.

These and other illustrative embodiments include, without limitation, methods, apparatus, systems, and computer program products comprising processor-readable storage media.

BRIEF DESCRIPTION OF THE DRAWINGS

FIG. 5 shows a table including examples of trust score assignments and other information associated with multiple IoT devices for each of first and second users.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
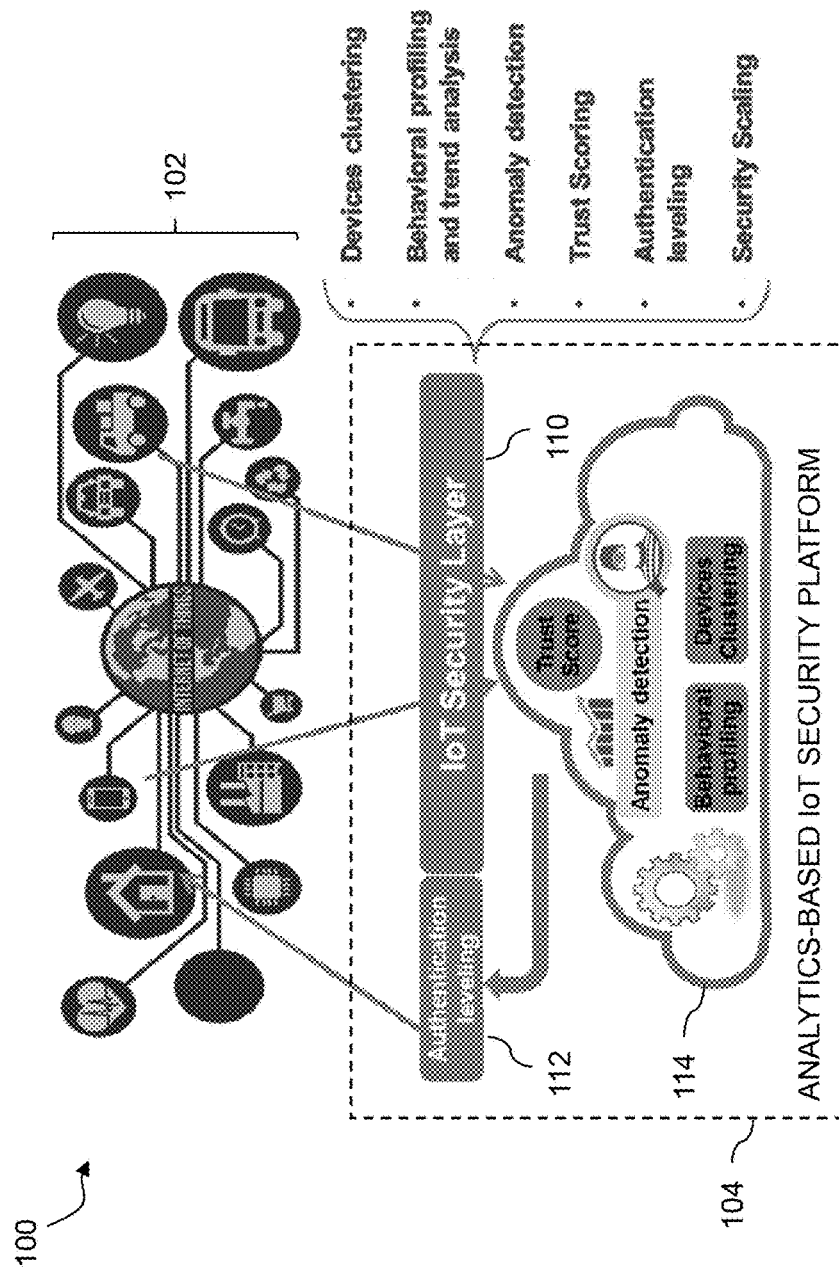
FIG. 1 shows an analytics-based IoT security platform in an illustrative embodiment of the invention.

FIG. 1 shows an information processing system 100 comprising a plurality of IoT devices 102 and an analytics-based IoT security platform 104. Communication between the IoT devices 102 and the IoT security platform 104 is assumed to be supported by one or more networks that are not explicitly shown in the figure.

The IoT security platform 104 implements a security-as-a-service portal accessible to the IoT devices 102. The security-as-a-service portal in this embodiment illustratively comprises an IoT security layer 110, an authentication leveling module 112, and an analytics engine 114. The IoT security layer 110 and authentication leveling module 112 represent portions of the security-as-a-service portal that are directly accessible to the IoT devices 102 in the present embodiment, although other accessibility arrangements can be used in other embodiments. The analytics engine 114 is configured to assign trust scores to respective ones of the IoT devices 102 for use in authentication leveling, and supports additional functionality within the IoT security platform 104 such as clustering of IoT devices, behavioral profiling and trend analysis, anomaly detection and security scaling.

It should be noted in this regard that the term "portal" as used herein is intended to be broadly construed, and in the present embodiment is assumed to incorporate the analytics engine 114. However, in other embodiments, the analytics engine 114 may be implemented at least in part outside of the portal, for example, as a back-end component of the analytics-based IoT security platform 104.

In the present embodiment, the authentication leveling functionality of the security-as-a-service portal is provided to the IoT devices 102 via the IoT security layer 110 and the authentication leveling module 112 based at least in part on the trust scores assigned to those devices by the analytics engine 114. For example, in one aspect of the authentication leveling functionality, a first one of the IoT devices 102 accesses the security-as-a-service portal to identify a level of authentication to be applied by the first IoT device in authenticating a second one of the IoT devices 102.

The identification of the level of authentication to be applied can be implemented in various ways in the system 100. For example, the security-as-a-service portal can determine the authentication level to be applied by the first IoT device in authenticating the second IoT device based at least in part on the trust score assigned to the second IoT device. The security-as-a-service portal then communicates the determined authentication level to the first IoT device. As another example, the security-as-a-service portal can communicate at least the trust score of the second IoT device to the first IoT device so as to permit the first IoT device to determine the authentication level to be applied by the first IoT device in authenticating the second IoT device. Numerous other alternative authentication level identification arrangements are possible involving various different types of communication between the IoT devices 102 and complements of the IoT security platform 104.

At least portions of the IoT devices 102 in the present embodiment are assumed to be registered with the security-as-a-service portal. For example, a given one of the registered IoT devices may be registered in association with a user identifier, a network address and an IoT network identifier.

The clustering of devices in the IoT security platform 104 in some embodiments illustratively involves the IoT devices 102 being organized by the security-as-a-service portal into a plurality of clusters each associated with a corresponding user. In such an arrangement, the analytics engine 114 is illustratively configured to assign trust scores to respective ones of the clusters, in addition to assignment of individual trust scores to respective individual ones of the IoT devices 102.

The various authentication levels in some embodiments can include two or more distinct authentication levels. For example, the level of authentication identifiable utilizing the authentication leveling functionality of the security-as-a-service portal illustratively comprises a lightweight authentication level identified based at least in part on at least a given one of the trust scores being above a first threshold, a full authentication level identified based at least in part on the given trust score being below a second threshold, and at least one intermediate authentication level based at least in part on the given trust score being between the first and second thresholds. Numerous other arrangements of multiple distinct authentication levels can be used in other embodiments.

At least a subset of the IoT devices 102 can be associated with respective system users. The term "user" in this context and elsewhere herein is intended to be broadly construed so as to encompass, for example, human, hardware, software or firmware entities, as well as various combinations of such entities. Accordingly, a user may be a human user, or a software entity such as an application, or any of a wide variety of other entity arrangements.

In some embodiments, the analytics engine 114 is further configured to assign trust score weightings to respective ones of at least a subset of the IoT devices 102 wherein the weightings are applied to the corresponding trust scores in generating a composite trust score over multiple ones of the IoT devices associated with a given user. As a result, some IoT devices may have a higher weight in trust scoring than other IoT devices. For example, a smart phone that is typically with a given user and implements high levels of security functionality may be assigned a higher weight than a smart fitness wristband or smart watch.

In providing the above-noted trend analysis functionality, the analytics engine 114 is illustratively configured to implement a trend analysis model utilizing supervised learning for at least a subset of the IoT devices and/or for clusters each comprising multiple ones of the IoT devices. Similarly, supervised learning can be utilized in conjunction with implementation of behavioral profiling, anomaly detection, and other analytics-based functionality within the IoT security platform 104. Again, such functionality can be applied to individual ones of the IoT devices and/or to clusters of multiple ones of the IoT devices. The clustering of devices can be based on user, or on other factors such as organizational entity, device type, device configuration or other device characteristics. A given cluster can be utilized to form a trust zone for a given user, or for other arrangements of characteristics.

The IoT devices 102 are illustratively distributed over a wide geographic area, and configured to communicate over one or more networks with the IoT security platform 104. The IoT security platform 104 may also be distributed. For example, the IoT security platform 104 in some embodiments is implemented using a plurality of distributed processing nodes, illustratively comprising cloud compute nodes and cloud storage nodes of cloud infrastructure, although numerous other arrangements are possible.

As a more particular example, a distributed implementation of the analytics-based IoT security platform 104 in one embodiment is configured to perform analytics operations in accordance with a processing framework supported by an Apache Hadoop YARN ("Yet Another Resource Negotiator") cluster. Examples of frameworks supported by the Hadoop YARN platform include MapReduce, Spark, Hive, MPI and numerous others. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein.

In some embodiments, a plurality of processing nodes collectively implement a distributed analytics platform that is more particularly in the form of a multi-cluster distributed data processing platform. Such a platform may comprise, for example, a plurality of potentially geographically-distributed YARN clusters each comprising a corresponding cluster of distributed processing nodes.

It is to be appreciated that a wide variety of other types of processing nodes can be used in other embodiments. For example, additional or alternative types of processing node functionality that may be incorporated in at least a subset of the processing nodes of an information processing system in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It is to be appreciated that the particular arrangement of system elements shown in FIG. 1 is for purposes of illustration only, and that other arrangements of additional or alternative elements can be used in other embodiments. For example, numerous alternative information processing system configurations can be used to implement analytics-based IoT security functionality as disclosed herein.

The operation of the system 100 will now be described in further detail with reference to the flow diagram of FIG. 2. The process as shown includes steps 200, 202 and 204, and is suitable for use in the system 100 but is more generally applicable to other types of information processing systems.

In step 200, a security-as-a-service portal is implemented in an information processing system. The security-as-a-service portal is accessible to a plurality of IoT devices over at least one network. With reference to the FIG. 1 embodiment, a security-as-a-service portal implemented by analytics-based IoT security platform 104 illustratively comprises IoT security layer 110, authentication leveling module 112, and an underlying analytics engine 114. It is assumed for this embodiment that the analytics engine 114 is part of the security-as-a-service portal of the IoT security platform 104. However, in other embodiments, the analytics engine 114 can be implemented at least in part separately from the security-as-a-service portal, possibly using a separate analytics platform.

In step 202, trust scores are assigned in the analytics engine of the security-as-a-service portal to respective ones of the IoT devices. As mentioned previously, trust scores may assigned in the FIG. 1 embodiment to individual ones of the IoT devices 102 as well as to clusters of those devices that share similar characteristics, such as association with a particular user or organizational entity, or a particular device type or configuration.

In step 204, authentication leveling functionality is provided for the IoT devices via the security-as-a-service portal based at least in part on the assigned trust scores. In accordance with one aspect of the authentication leveling functionality in the FIG. 1 embodiment, a first one of the IoT devices 102 accesses the security-as-a-service portal of the analytics-based IoT security platform 104 to identify a level of authentication to be applied by the first IoT device in authenticating a second one of the IoT devices. For example, the IoT security platform can determine the authentication level to be applied by the first IoT device in authenticating the second IoT device based at least in part on the trust score assigned to the second IoT device, and communicate the determined authentication level to the first IoT device via the security-as-a-service portal. As another example, the IoT security platform 104 can communicate at least the trust score of the second IoT device to the first IoT device via the security-as-a-service portal so as to permit the first IoT device to determine the authentication level to be applied by the first IoT device in authenticating the second IoT device.

In some embodiments, the analytics-based IoT security platform 104 is configured to leverage Big Data profiles and associated Big Data analytics in determining authentication levels for different ones of the IoT devices 102. Such embodiments gain real-time, predictive and actionable insights from IoT and Big Data.

Additional details regarding Big Data profiles and associated Big Data analytics that can be implemented in illustrative embodiments of the present invention are described in U.S. Pat. No. 9,031,992, entitled "Analyzing Big Data," which is commonly assigned herewith and incorporated by reference herein.

The analytics-based IoT security platform 104 in some embodiments leverages one or more frameworks supported by Hadoop YARN, such as MapReduce, Spark, Hive, MPI and numerous others, to support distributed computations relating to the IoT devices 102.

Figure 2:
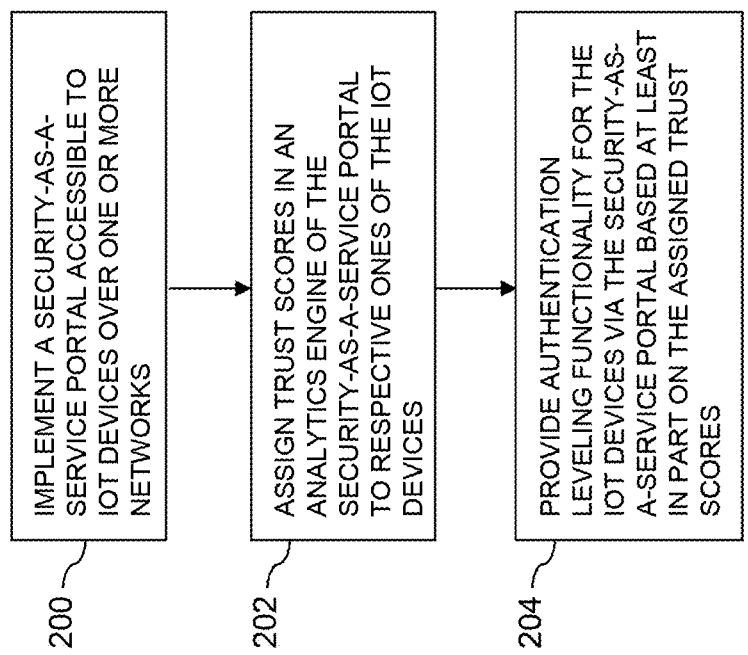
FIG. 2 is a flow diagram of an example process implemented in the analytics-based IoT security platform of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing analytics-based IoT security functionality. For example, the ordering of the process steps may be varied in other embodiments, or certain steps may be performed concurrently with one another rather than serially. Also, one or more of the process steps may be repeated periodically for different types of analytics functionality, or multiple instances of the process can be performed in parallel with one another for different sets of IoT devices.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional details regarding exemplary IoT devices utilizable in illustrative embodiments will now be described.

The IoT devices 102 illustratively comprise, for example, distributed sensors, smart objects, smart appliances, smart automobiles or other types and arrangements of interconnected IoT devices. For example, one type of IoT device comprises a sensor that has the ability to monitor and measure a set of properties of its surroundings, and a mechanism to make these measurements available to other system entities. It is also possible for some of the IoT devices 102 to comprise more sophisticated devices such as mobile telephones, laptop computers, tablet computers or other types of processing devices. Additional illustrative examples of these and other types of IoT devices are disclosed in ITU-T Recommendation Y.2060, dated June 2012, which is incorporated by reference herein. Accordingly, the term "IoT device" as used herein is intended to be broadly construed.

In some embodiments, at least a subset of the IoT devices 102 are registered with the security-as-a-service portal provided by the analytics-based IoT security platform 104. Such registration for a given one of the IoT devices 102 may involve, for example, registering an IP address or other network information of the given device with the IoT security layer 110. Other types of IoT device registration can be used in other embodiments. Also, in some embodiments, at least a portion of the IoT devices 102 need not be registered with the security-as-a-service portal of the IoT security platform 104.

The IoT devices 102 illustratively comprise IoT devices of different sectors of one or more IoT architectural frameworks.

Figure 3:
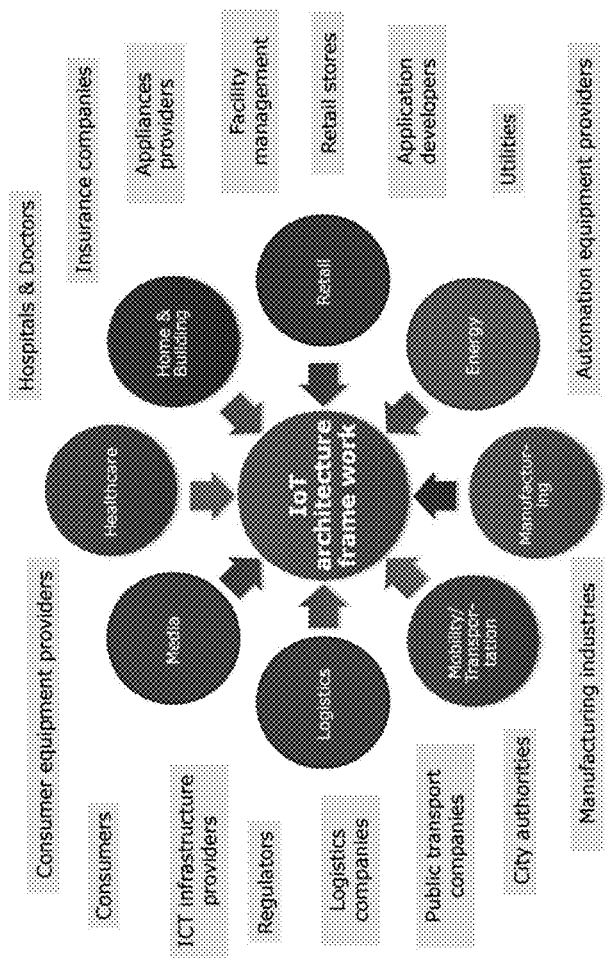
FIG. 3 shows examples of multiple IoT architecture framework sectors each comprising IoT devices that can utilize security-as-a-service portals of IoT security platforms in illustrative embodiments.

Referring now to FIG. 3, examples of multiple IoT architecture framework sectors are shown. Each of these sectors is assumed to comprise a plurality of IoT devices which may represent a corresponding subset of the IoT devices 102. Accordingly, multiple ones of the sectors illustrated in FIG. 3 can utilize a single instance of a security-as-a-service portal as disclosed herein, or different sectors can utilize separate such portals. The multiple sectors of the IoT architecture framework in this embodiment comprise healthcare, home & building, retail, energy, manufacturing, mobility/transportation, logistics and media. Each such sector is associated with various companies, organizations, users or other entities, as illustrated in the figure. It is to be appreciated that these entities and their corresponding sectors are just examples, and other IoT architecture frameworks can be used in other embodiments. Each such framework comprises one or more sectors that includes IoT devices that can utilize security-as-a-service portals of IoT security platforms in illustrative embodiments.

Additional processes and other features and functionality of an analytics-based IoT security platform will now be described with reference to FIGS. 4 through 7.

Figure 4:
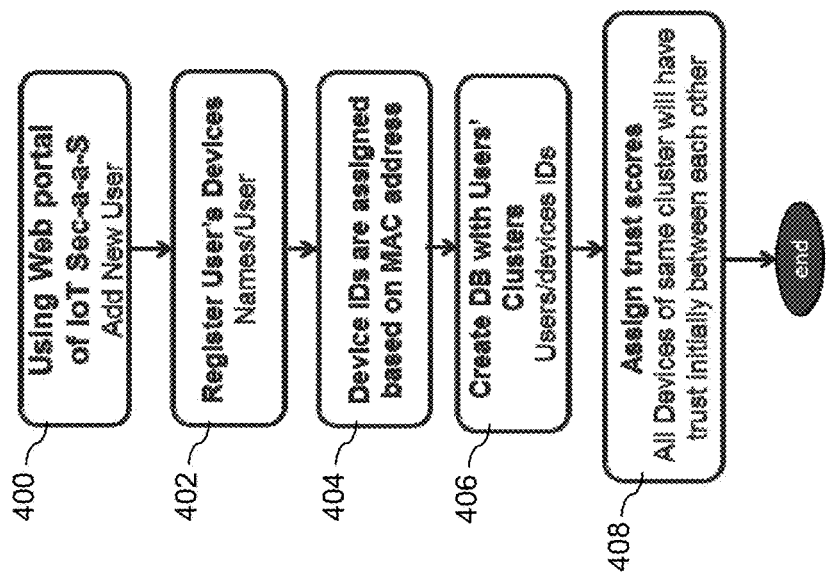
FIG. 4 is a flow diagram of an example IoT device registration and clustering process in an illustrative embodiment.

Referring initially to FIG. 4, a flow diagram of an example IoT device registration and clustering process is shown. This process is illustratively implemented in the IoT security platform 104 utilizing the analytics engine 114, and comprises steps 400 through 408. In step 400, a web portal of the IoT security platform providing security-as-a-service functionality is utilized to add a new user. In step 402, multiple IoT devices associated with the new user are registered. Each such IoT device is illustratively identified by a name and other identifying information. In step 404, IoT device identifiers (IDs) are assigned to respective ones of the IoT devices of the new user, illustratively based on media access control (MAC) addresses of those devices. Other types of network addresses or other information can be used in assigning the IoT device IDs. In step 406, a database (DB) is created that includes clusters of IoT devices for each of multiple users. The database relates the users to their corresponding IoT devices via the IoT device IDs. The database is assumed to be part of a storage system within or otherwise associated with the IoT security platform 104. In step 408, the analytics engine 114 of the IoT security platform 104 assigns trust scores to respective one of the IoT devices. It is assumed in this embodiment that all of the IoT devices within the same cluster initially have an established trust between each other, although such assumed initial trust is not a requirement. A cluster may therefore be viewed in some embodiments as corresponding to a trust zone.

The process then ends as indicated, but is assumed to be repeated periodically as additional users register their IoT devices with the system. Accordingly, the FIG. 4 process is repeated for each of a plurality of new users. Each of those users illustratively has multiple IoT devices associated therewith. These devices are registered and assigned trust scores in the manner illustrated in the figure.

Turning now to FIG. 5, a table 500 is shown that includes examples of trust score assignments and other information associated with multiple IoT devices for each of first and second users. The first and second users are denoted User 1 and User 2, respectively. The IoT devices of User 1 include a mobile telephone ("mobile"), a "cooker" which may comprise a stove, microwave oven or other similar appliance, electronic curtains ("e-curtains") and a door. The IoT devices of User 2 include a mobile, a laptop, a cooker and a car. Each of the IoT devices of User 1 and User 2 has a distinct MAC address, as well as an IoT device ID and a corresponding trust score. The IoT device IDs in this example are also referred to as IoT Net IDs. The trust scores in this example are integer numbers such as 7, 8 and 9.

The trust scores illustratively fall within a predetermined range, such as the range of integers from 1 to 10, with a low trust score indicating a relatively low level of trust necessitating a relative high level of authentication, and a high trust score indicating a relatively high level of trust necessitating a relative low level of authentication.

Figure 6:
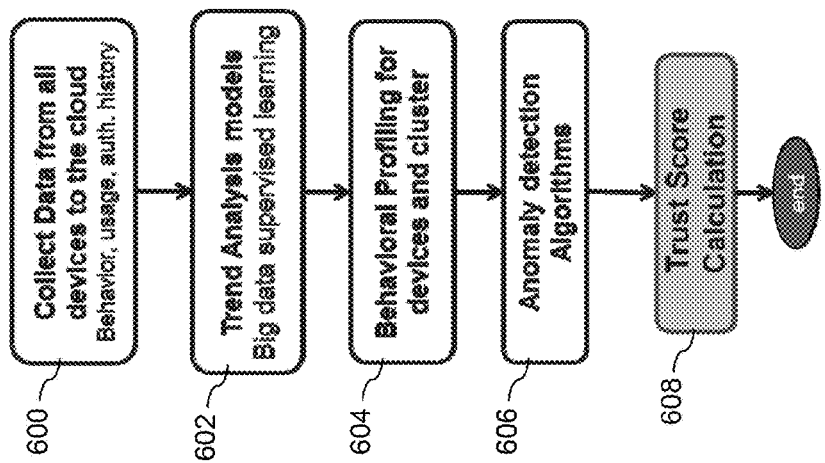
FIGS. 6 and 7 are flow diagrams of respective example processes for trust score assignment and authentication leveling in illustrative embodiments.

FIG. 6 illustrates analytics-based functionality involved in determining trust scores for respective ones of the IoT devices 102. This trust score assignment process is illustratively implemented in the IoT security platform 104 utilizing the analytics engine 114, and comprises steps 600 through 608. In step 600, data is collected from the IoT devices 102 include the IoT security platform 104, which in this embodiment is assumed to be implemented within the cloud, using cloud infrastructure. Such data comprises information characterizing IoT device behavior, usage and authentication history, although additional or alternative types of information may be used in other embodiments.

In step 602, trend analysis models are applied by the analytics engine 114 utilizing Big Data supervised learning. In step 604, behavioral profiling is implemented both for individual IoT devices and for clusters of multiple IoT devices based at least in part on the trend analysis performed in step 602. In step 606, one or more anomaly detection algorithms are executed based at least in part on the behavioral profiling of step 604. A trust score is then calculated and assigned to each IoT device in step 608. Additionally or alternatively, trust scores may be assigned to IoT device clusters. The process then ends as indicated, but is assumed to be repeated periodically as additional IoT data becomes available within the system.

The FIG. 6 process illustrates that some embodiments leverage behavioral profiling and anomaly detection to provide insights into IoT device security and trust. For example, data analytics techniques are utilized to perform behavioral profiling for each IoT device to see how it behaves with respect to itself, similar devices and other cluster members. Such techniques provide insight into what is considered "normal" behavior for a given IoT device. The anomaly detection techniques are then utilized to capture any unusual behavior for the IoT device and its trust score is updated accordingly.

Figure 7:
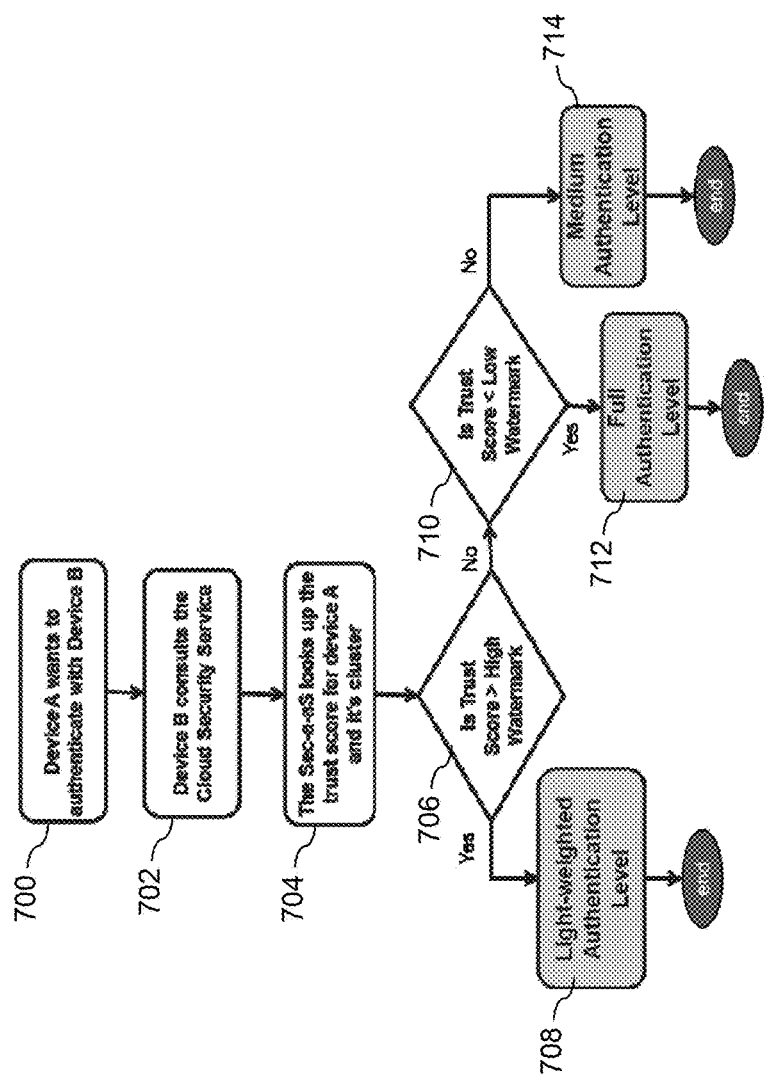

Referring now to FIG. 7, an example process for authentication leveling is shown. This authentication leveling process is illustratively implemented in the IoT security platform 104 utilizing the authentication leveling module 112, and comprises steps 700 through 714. In step 700, one of the IoT devices 102 denoted as Device A wants to authenticate with another one of the IoT devices denoted as Device B. It is assumed that Device B similarly wants to authenticate with Device A. Accordingly, the two devices desire to authenticate one another in order to allow them to communicate in a secure manner. In step 702, Device B consults a cloud security service provided by the security-as-a-service portal of the IoT security platform 104. The cloud security service in this embodiment is assumed to be a cloud-based implementation of the security-as-a-service portal. In step 704, the security-as-a-service portal looks up the trust score for Device A and its corresponding cluster, if any. The trust score of the cluster may be determined as a weighted combination of the individual trust scores of the IoT devices within that cluster. In the FIG. 7 process, additional logic may be included to determine if the IoT device trust score, the cluster trust score, or some combination of both, should be used in subsequent trust score processing operations.

A determination is made in step 706 as to whether or not the trust score is greater than a first threshold, also referred to in this example as a "high watermark." If the trust score is above the high watermark, a lightweight authentication level is indicated in step 708. Otherwise, an additional determination is made in step 710 as to whether or not the trust score is less than a second threshold, also referred to in this example as a "low watermark." If the trust score is below the low watermark, a full authentication level is indicated in step 712. Otherwise, the trust score is at one of the high and low watermarks or between the high and low watermarks, and an intermediate or "medium" authentication level is indicated in step 714.

The resulting authentication level from step 708, 712 or 714 may be communicated by the security-as-a-service portal to Device B in order to allow it to authenticate Device A using the appropriate authentication level.

A similar instance of the FIG. 7 process is assumed to be carried out in order to allow Device A to access the security-as-a-service portal to determine the appropriate authentication level for it to apply in authenticating Device B.

By way of example, the full authentication level in step 712 may require multiple authentication factors, such as password and token authentication. More particularly, in a situation in which a given user has not recently authenticated using any of the devices in the device cluster of that user, the user may be required to authenticate from one of those devices using the full authentication level. The medium authentication level is a lower level that may be required when one or two of the cluster devices are already authenticated. For example, a user may have already authenticated using a mobile phone and smart fitness wristband, and be trying to authenticate to a laptop within the same cluster. The lightweight authentication level is the lowest level and may be required when almost all of the cluster devices are already authenticated. For example, a user may have already authenticated using a mobile phone, smart fitness wristband, laptop and smart watch within a given cluster, and be trying to access a smart car or login to a smart transportation system also within that cluster. Accordingly, in some embodiments the trust scores of individual IoT devices and possibly also their associated clusters can vary dynamically as IoT devices authenticate one another within the system.

Although there are three distinct levels of authentication used in the present embodiment, other embodiments could utilize more or fewer authentication levels.

In some of these embodiments, the security-as-a-service portal determines the authentication level to be applied by a first IoT device in authenticating a second IoT device based at least in part on the trust score assigned to the second IoT device, and communicates the determined authentication level to the first IoT device. In such an arrangement, the determinations in steps 706 and 710 are illustratively performed by the security-as-a-service portal of the IoT security platform 104.

Alternatively, the security-as-a-service portal can be configured to communicate at least the trust score of the second IoT device to the first IoT device so as to permit the first IoT device to determine the authentication level to be applied by the first IoT device in authenticating the second IoT device. In such an arrangement, the determinations in steps 706 and 710 are illustratively performed by the first IoT device using the trust score provided by the security-as-a-service portal of the IoT security platform 104. Again, numerous other alternative arrangements are possible.

It is to be appreciated that embodiments of the invention can be implemented in a wide variety of different IoT contexts, from small-sized IoT networks like smart homes to large IoT networks like factory automation and smart city arrangements.

For example, IoT device manufacturers that do not incorporate strong security functionality in their manufactured devices can subscribe to a security-as-a-service portal and offer it as part of their device functionality. Such an arrangement can also eliminate the burdens of a given IoT device manufacturer attempting to standardize its security protocols with those of other IoT device manufacturers.

As another example, embodiments of the invention can be utilized by telecom providers and other IoT service providers to implement security functionality across a wide variety of different types of IoT devices.

In addition, end users can subscribe to a security-as-a-service portal in small-sized deployments such as smart home environments. Such an arrangement can allow a user to register all of his or her IoT devices and to implement corresponding customized security policies via the IoT security platform.

As indicated elsewhere herein, illustrative embodiments can provide a number of significant advantages relative to conventional arrangements.

For example, some embodiments provide analytics-based IoT security platforms using dynamic trust scoring and authentication leveling. Such arrangements utilize the potentially enormous number of IoT devices to authenticate one another in an efficient and flexible manner that is distributed over the IoT devices. The IoT security platform levels the IoT devices themselves to provide trust scoring and authentication leveling in a manner that facilitates authentication for users while also providing a high level of security against intruders and other attackers.

Illustrative embodiments utilize a security-as-a-service portal to provide dynamic trust scoring and associated authentication leveling functionality for IoT devices. Such arrangements can be used to allow IoT devices to authenticate one another in a particularly efficient and scalable manner. In addition, Big Data analytics can be leveraged by the security-as-a-service portal to implement trend analysis models, behavioral profiling and anomaly detection in generating and assigning trust scores to individual IoT devices or clusters of such devices.

In some embodiments, a security-as-a-service portal provided by an analytics-based IoT security platform easily scales to accommodate increasingly large numbers of IoT devices without requiring any significant redesign of the devices themselves and without undermining overall system security and performance. Big Data analytics implemented within the IoT security platform utilize data collected from the IoT devices to ensure that trust scores are generated and assigned in an accurate and efficient manner.

Some embodiments enable IoT cross-domain interaction and IoT security through distributed clusters of IoT devices. In such arrangements, interoperability and functional exchangeability can be facilitated using open source software.

An IoT architecture framework can be defined in a given embodiment that covers the architectural needs of multiple IoT application domains. Such an arrangement can increase the transparency of IoT system architectures to support system benchmarking, safety and security assessments.

Illustrative embodiments avoid the costs and complexities associated with implementing additional security functionality within IoT devices. Instead, an analytics-based IoT security platform allows security functionality to be decoupled as a separate service that can be standardized and seamlessly managed.

Moreover, illustrative embodiments are highly dynamic and take into consideration the valuable information that can be obtained from monitored IoT device behavior utilizing Big Data analytics.

These and other embodiments support a security-as-a-service paradigm that readily scales up with the increasing number of devices in the IoT network to achieve a fully automated machine-to-machine (M2M) secure communication IoT security platform leveraging Big Data analytics and related functionality.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail in conjunction with FIGS. 8 and 9. Although described primarily in the context of information processing system 100, these platforms may also be used to implement at least portions of other information processing systems in other embodiments of the invention.

Figure 8:
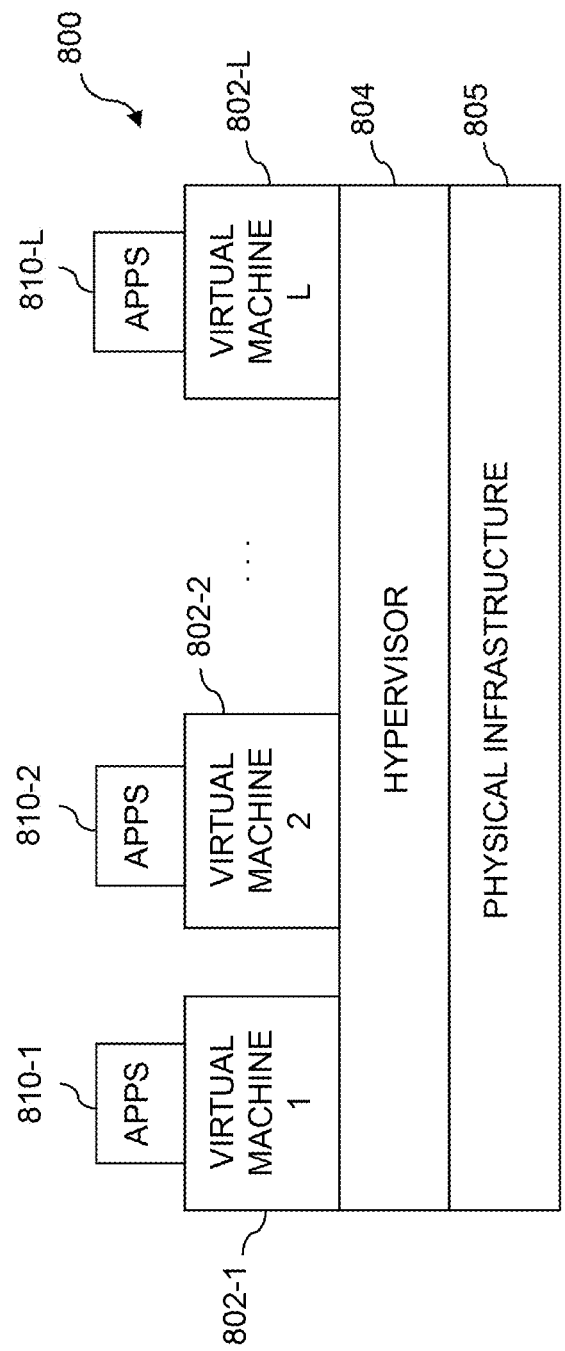
FIGS. 8 and 9 show examples of processing platforms that may be utilized to implement at least a portion of the analytics-based IoT security platform of FIG. 1.
Figure 9:
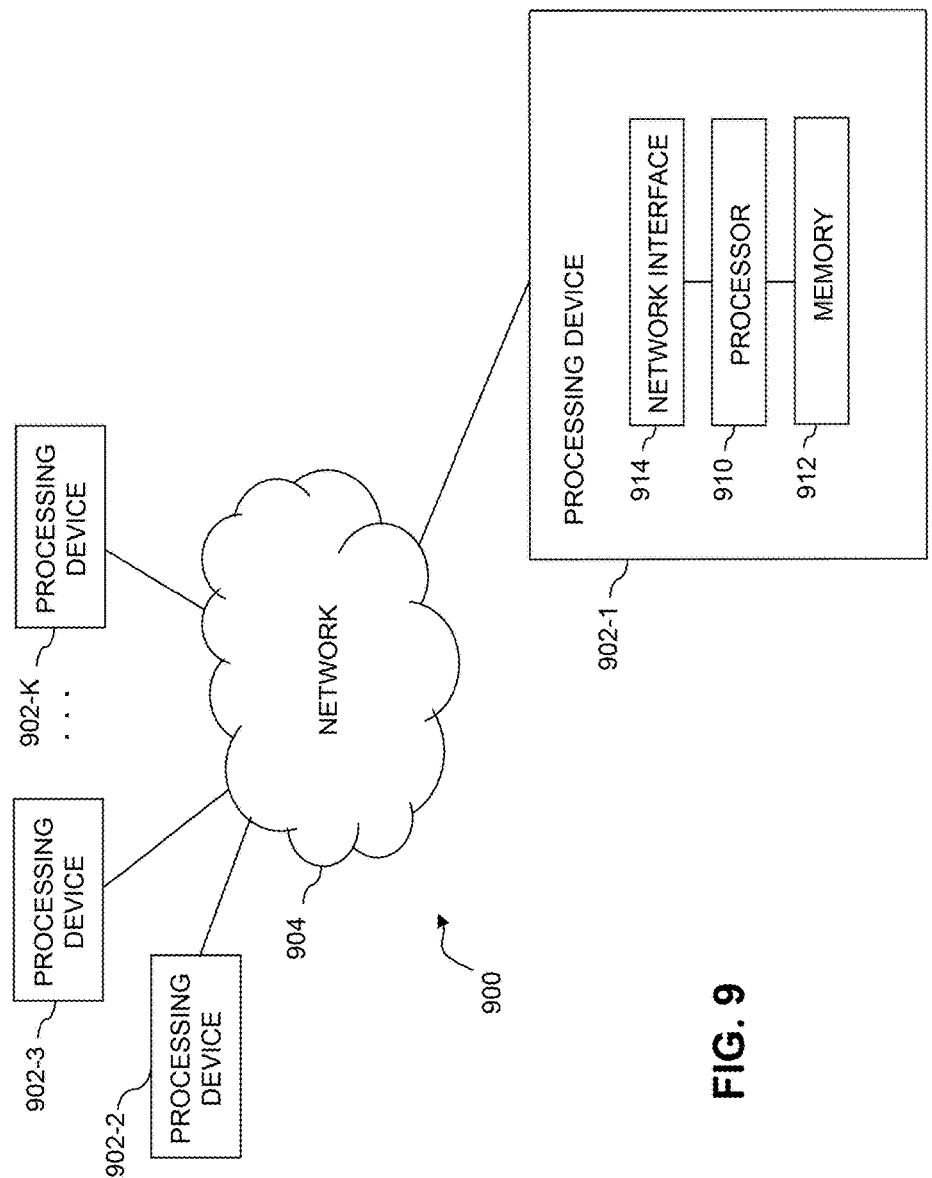

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises virtual machines (VMs) 802-1, 802-2, ... 802-L implemented using a hypervisor 804. The hypervisor 804 runs on physical infrastructure 805. The cloud infrastructure 800 further comprises sets of applications 810-1, 810-2, ... 810-L running on respective ones of the virtual machines 802-1, 802-2, ... 802-L under the control of the hypervisor 804.

These and other types of cloud infrastructure can be used to implement one or more system components such as IoT security layer 110, authentication leveling module 112 and analytics engine 114, or portions thereof, in a given embodiment.

Although only a single hypervisor 804 is shown in the embodiment of FIG. 8, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 804 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

More specifically, some embodiments can implement a message buffer utilizing DAS storage configurations comprising local hard drives in respective servers, or in the form of a specialized high-performance buffer using flash storage such as DSSD™ accessible via PCIe connections. Numerous alternative configurations are possible for the message buffer and other components of the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, ... 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company. For example, portions of an analytics-based IoT security platform of the type disclosed herein can be implemented, for example, using DAS on converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of a security-as-a-service portal or other functionality of a given analytics-based IoT security platform in a particular embodiment are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, analytics-based IoT security platforms, security-as-a-service portals, analytics engines, authentication leveling modules and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a processing platform comprising a plurality of processing devices each comprising a processor coupled to a memory;
   the processing platform being configured to communicate with a plurality of IoT devices over at least one network;
   wherein the processing platform implements a security-as-a-service portal accessible to the IoT devices;
   the security-as-a-service portal comprising an analytics engine configured to assign trust scores to respective ones of the IoT devices;
   the security-as-a-service portal providing authentication leveling functionality for the IoT devices based at least in part on the assigned trust scores;

wherein in accordance with the authentication leveling functionality a first one of the IoT devices accesses the security-as-a-service portal to identify a level of authentication to be applied by the first IoT device in authenticating a second one of the IoT devices; and wherein the authentication leveling functionality of the security-as-a-service portal further comprises providing to the first IoT device information sufficient to allow the first IoT device to identify at least first and second different levels of authentication to be applied by the first IoT device in authenticating respective ones of the second IoT device and an additional one of the IoT devices, based at least in part on different trust scores assigned by the analytics engine to the respective second and additional IoT devices.

2. The apparatus of claim 1 wherein the IoT devices comprise IoT devices that have been registered with the security-as-a-service portal.

3. The apparatus of claim 2 wherein a given one of the registered IoT devices is registered in association with a user identifier, a network address and an IoT network identifier.

4. The apparatus of claim 1 wherein the IoT devices are organized by the security-as-a-service portal into a plurality of clusters each associated with a corresponding user.

5. The apparatus of claim 4 wherein the analytics engine is further configured to assign trust scores to respective ones of the clusters.

6. The apparatus of claim 1 wherein the security-as-a-service portal comprises at least one of an IoT security layer and authentication leveling module arranged between the IoT devices and the analytics engine.

7. The apparatus of claim 1 wherein the security-as-a-service portal determines the authentication level to be applied by the first IoT device in authenticating the second IoT device based at least in part on the trust score assigned to the second IoT device, and communicates the determined authentication level to the first IoT device.

8. The apparatus of claim 1 wherein the security-as-a-service portal communicates at least the trust score of the second IoT device to the first IoT device so as to permit the first IoT device to determine the authentication level to be applied by the first IoT device in authenticating the second IoT device.

9. The apparatus of claim 1 wherein the level of authentication identifiable utilizing the authentication leveling functionality of the security-as-a-service portal comprises:
 a lightweight authentication level identified based at least in part on at least a given one of the trust scores being above a first threshold;
 a full authentication level identified based at least in part on the given trust score being below a second threshold; and
 at least one intermediate authentication level based at least in part on the given trust score being between the first and second thresholds.

10. The apparatus of claim 1 wherein the analytics engine is further configured to assign trust score weightings to respective ones of at least a subset of the IoT devices wherein the weightings are applied to the corresponding trust scores in generating a composite trust score over multiple ones of the IoT devices associated with a given user.

11. The apparatus of claim 1 wherein the analytics engine is further configured to implement a trend analysis model utilizing supervised learning for at least one of: (i) at least a subset of the IoT devices; and (ii) one or more clusters each comprising multiple ones of the IoT devices.

12. The apparatus of claim 1 wherein the analytics engine is further configured to implement behavioral profiling for at least one of: (i) at least a subset of the IoT devices; and (ii) one or more clusters each comprising multiple ones of the IoT devices.

13. The apparatus of claim 1 wherein the analytics engine is further configured to implement an anomaly detection algorithm for at least one of: (i) at least a subset of the IoT devices; and (ii) one or more clusters each comprising multiple ones of the IoT devices.

14. The apparatus of claim 1 wherein the security-as-a-service portal is implemented in an information processing system.

15. A method comprising:
 implementing a security-as-a-service portal accessible to a plurality of IoT devices over at least one network;
 assigning trust scores in an analytics engine of the security-as-a-service portal to respective ones of the IoT devices; and
 providing authentication leveling functionality for the IoT devices via the security-as-a-service portal based at least in part on the assigned trust scores;
 wherein in accordance with the authentication leveling functionality a first one of the IoT devices accesses the security-as-a-service portal to identify a level of authentication to be applied by the first IoT device in authenticating a second one of the IoT devices;
 wherein the authentication leveling functionality of the security-as-a-service portal further comprises providing to the first IoT device information sufficient to allow the first IoT device to identify at least first and second different levels of authentication to be applied by the first IoT device in authenticating respective ones of the second IoT device and an additional one of the IoT devices, based at least in part on different trust scores assigned by the analytics engine to the respective second and additional IoT devices; and
 wherein the implementing, assigning and providing are performed by a processing platform comprising a plurality of processing devices each comprising a processor coupled to a memory.

16. The method of claim 15 further comprising:
 determining the authentication level to be applied by the first IoT device in authenticating the second IoT device based at least in part on the trust score assigned to the second IoT device; and
 communicating the determined authentication level to the first IoT device via the security-as-a-service portal.

17. The method of claim 15 further comprising communicating at least the trust score of the second IoT device to the first IoT device via the security-as-a-service portal so as to permit the first IoT device to determine the authentication level to be applied by the first IoT device in authenticating the second IoT device.

18. A computer program product comprising a non-transitory processor-readable storage medium having stored therein program code of one or more software programs, wherein the program code when executed by at least one processing device of a processing platform causes said at least one processing device:
 to implement a security-as-a-service portal accessible to a plurality of IoT devices over at least one network;
 to assign trust scores in an analytics engine of the security-as-a-service portal to respective ones of the IoT devices; and to provide authentication leveling functionality for the IoT devices via the security-as-a-service portal based at least in part on the assigned trust scores;

wherein in accordance with the authentication leveling functionality a first one of the IoT devices accesses the security-as-a-service portal to identify a level of authentication to be applied by the first IoT device in authenticating a second one of the IoT devices; and wherein the authentication leveling functionality of the security-as-a-service portal further comprises providing to the first IoT device information sufficient to allow the first IoT device to identify at least first and second different levels of authentication to be applied by the first IoT device in authenticating respective ones of the second IoT device and an additional one of the IoT devices, based at least in part on different trust scores assigned by the analytics engine to the respective second and additional IoT devices.

19. The computer program product of claim 18 wherein the program code when executed by said at least one processing device further causes said at least one processing device:
- to determine the authentication level to be applied by the first IoT device in authenticating the second IoT device based at least in part on the trust score assigned to the second IoT device; and
- to communicate the determined authentication level to the first IoT device via the security-as-a-service portal.

20. The computer program product of claim 18 wherein the program code when executed by said at least one processing device further causes said at least one processing device to communicate at least the trust score of the second IoT device to the first IoT device via the security-as-a-service portal so as to permit the first IoT device to determine the authentication level to be applied by the first IoT device in authenticating the second IoT device.

* * * * *